US008692786B2

(12) United States Patent
Diederiks et al.

(10) Patent No.: US 8,692,786 B2
(45) Date of Patent: Apr. 8, 2014

(54) USER INTERFACE DEVICE AND METHOD FOR CONTROLLING A CONNECTED CONSUMER LOAD, AND LIGHT SYSTEM USING SUCH USER INTERFACE DEVICE

(75) Inventors: Elmo Marcus Attila Diederiks, Eindhoven (NL); Jonathan Mason, Waalre (NL); Bartel Marinus Van De Sluis, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 621 days.

(21) Appl. No.: 12/994,882

(22) PCT Filed: Jun. 3, 2009

(86) PCT No.: PCT/IB2009/052337
§ 371 (c)(1),
(2), (4) Date: Nov. 29, 2010

(87) PCT Pub. No.: WO2009/150571
PCT Pub. Date: Dec. 17, 2009

(65) Prior Publication Data
US 2011/0074672 A1   Mar. 31, 2011

(30) Foreign Application Priority Data

Jun. 10, 2008 (EP) .................................... 08104342

(51) Int. Cl.
*G09G 5/00* (2006.01)
(52) U.S. Cl.
USPC ............................................ 345/173; 362/85
(58) Field of Classification Search
USPC ..................... 345/156, 173; 315/312; 362/85
See application file for complete search history.

(56) References Cited

U.S. PATENT DOCUMENTS

| 5,134,387 | A | 7/1992 | Smith et al. |
| 5,552,806 | A * | 9/1996 | Lenchik ........................ 345/156 |
| 6,388,399 | B1 * | 5/2002 | Eckel et al. ................... 315/312 |
| 6,608,617 | B2 | 8/2003 | Hoffknecht et al. |
| 7,186,003 | B2 | 3/2007 | Dowling et al. |
| 7,358,961 | B2 * | 4/2008 | Zwanenburg ................. 345/173 |
| 7,606,483 | B2 * | 10/2009 | Kurosawa .................... 396/299 |

(Continued)

FOREIGN PATENT DOCUMENTS

| WO | 9960804 A1 | 11/1999 |
| WO | 2007072294 A1 | 6/2007 |
| WO | 2007072315 A1 | 6/2007 |
| WO | 2007072316 A2 | 6/2007 |

*Primary Examiner* — Tom Sheng
(74) *Attorney, Agent, or Firm* — Mark Beloborodov; Joseph Noto (57) ABSTRACT

The invention relates to a user interface device for controlling an electrical consumer, in particular, a light system. Further, it relates to light system using such user interface device. Moreover it relates to a method for controlling such light system using a user interface device. To provide a user interface device, a light system and a method for controlling a consumer load providing feed forward or feed-back information facilitating an easy and intuitive use of the user interface device when controlling a light system, a user interface device for controlling a connected light system (44) is proposed, comprising: a display unit (12) including a plurality of LEDs (13) in a matrix form, wherein each of the LEDs (13) of the matrix is addressable individually; an input unit (11) to receive a user input; a control unit (40) adapted to receive a signal (1a) based on the user input and to generate an information signal (1b) provided to the display unit (12) and to generate a control signal (1c) for controlling the connected consumer load (44).

17 Claims, 8 Drawing Sheets

(56) References Cited

U.S. PATENT DOCUMENTS

| | | |
|---|---|---|
| 2003/0020742 A1* | 1/2003 | Hasha et al. ............... 345/700 |
| 2005/0275626 A1* | 12/2005 | Mueller et al. ............. 345/156 |
| 2007/0171196 A1* | 7/2007 | Pfingsten .................... 345/156 |
| 2007/0204237 A1* | 8/2007 | Guo et al. ................... 715/822 |
| 2007/0291506 A1* | 12/2007 | Nearhoof et al. ........... 362/600 |
| 2008/0204423 A1* | 8/2008 | Kim ............................ 345/173 |
| 2008/0284741 A1* | 11/2008 | Hsu et al. ................... 345/173 |
| 2009/0167507 A1* | 7/2009 | Maenpaa .................. 340/407.2 |
| 2010/0271252 A1* | 10/2010 | Musschebroeck et al. ... 341/176 |
| 2011/0089857 A1* | 4/2011 | Diederiks .................... 315/291 |

* cited by examiner

Preset 1 selected    Preset 2 selected

USER INTERFACE DEVICE AND METHOD FOR CONTROLLING A CONNECTED CONSUMER LOAD, AND LIGHT SYSTEM USING SUCH USER INTERFACE DEVICE

FIELD OF THE INVENTION

The invention relates to a user interface device for controlling an electrical consumer, in particular, a light system. Further, it relates to light system using such user interface device. Moreover it relates to a method for controlling such light system using a user interface device.

BACKGROUND OF THE INVENTION

In the fields of controlling electrical consumer loads user interface devices like switches or dimmers are used to adjust an amount of an electrical power provided from an electrical power source to an electrical consumer load. The electrical consumer load might be a lamp in a lighting system including a plurality of different lamps, an electrical motor in a home appliance like a kneading machine or in a vacuum cleaner or an electrical heater. In the easiest case the switch is a hard switch for merely switching on/off the power supply to the electrical consumer load. In an on state, the maximum available electrical power is supplied to the electrical consumer load and in the off state, no electrical power is supplied to the electrical consumer load. User interface devices or soft switches like dimmers can be applied to continuously adjust the electrical power supply to the electrical consumer load. Such dimmers have become popular in controlling light appliances.

Light systems are one of the most important ambience makers. People use light appliances to create different ambiences for different moods or activities. Research has shown that people also like to use colored light to further enhance those ambiences. Therefore, light appliances include a full color light sources to enable people to create these ambiences.

Further advanced light appliances are flexible and integrated. Such light systems comprise multiple full color light sources, variable color temperature light sources and 'normal' functional light sources. In some cases such light systems further interact with other electrical consumer loads like a HIFI-device, an electrical heater or an air-conditioner to further enhance the ambience generation. In other words, modern light systems do not only comprise a conventional illumination function but also ambience creation functions for influencing the mood in a room. At the beginning, these functions where merely applied in professional environments in offices and shops. However, this kind of ambience creation becomes more and more popular to average users.

Since these advanced light systems include a plurality of different lamps and in particular multiple full color light sources and/or variable color temperature light sources, the control of such advanced light appliance is very complex. A user interface device for controlling the light system requires a unique switch for each of the ambience creation function. This results not only in a huge space requirement for the overall light controller but makes the user interface device also difficult to use for average users. These discussed disadvantages are also valid for other electrical consumer loads to be controlled by a switch, like a plurality of indoor units of air conditioners in a house.

WO 2007/072315 proposes to interconnect a user interface and a light source to be electrically controlled by the user interface with an electronic controller. The electronic controller receives an instruction from the user interface and adjusts the electrical power at the light source based on the user instruction.

However, the application of conventional control devices for controlling an electrical consumer load is getting more complex or unmanageable with an increasing of the complexity of the overall system. This makes it difficult to use conventional control devices especially for the average user.

With the different possibilities and functions of such light systems, different and new types of controls are required. Next to on/off and dimming, one can envision controls for pre-set selection, color setting, daylight ambience, and so on. However such control functions are quite complex and the user is not aware which setting represents a desired characteristic of the light system. The user can only try several control functions until he arrives at the desired one. However, the feedback via the light system is very inconvenient.

OBJECT AND SUMMARY OF THE INVENTION

It is therefore an object of the present invention to provide a user interface device, a light system and a method for controlling a consumer load providing a feed forward or feedback information facilitating an easy and intuitive use of a user interface device when controlling an electrical consumer load, in particular a light system.

The object is solved by the features of the independent claims.

The invention is based on a thought to provide a user interface having a matrix of LEDs and an input unit, wherein when outputting a control signal to the consumer load, in particular a light system, to output in parallel an information signal to the display unit to provide a kind of feed forward or feedback information to the user via the display device. Each LED of the matrix in the display unit is individually addressable. The LEDs are particular full color solid state LEDs, which are capable to display a plurality of brightness values and color values. Further by using the LEDs it is possible to provide symbols or low level text to illustrate control elements for controlling the light system to the user. The user interface device looks similar to a conventional light switch so that the user will easily recognize it as a light controller. It is proposed that the user interface device has various control functions, which are programmable. The input device is preferably realized as a touch sensitive module for receiving a user input to control the setting of the light system. This provides the advantage that the user has the possibility to use a plurality of different control functions by maintaining a good easy-off use of the user interface device. The combination of the user interface device having a display device and an input unit according to the invention gives the possibility to provide the direct relation between the light output by the display device of the user interface device and the light setting in the room.

The matrix of LEDs is used to provide feed forward or feedback information on the status of the light. First of all, the light of the LEDs can reflect the light provided by the light system, which is controlled. Secondly, the matrix of LEDs is used as low resolution display to render a user interface comparable to a commercial user interface to display control elements like scales, preset area, symbols, text and numbers. This could be achieved since LEDs can be addressed easily and individually, so that the plurality of LEDs within the matrix could be driven differently thereby having the possibility to have a full degree of freedom to amend the colors, the brightness and the illustration of the LEDs on the display device. LEDs are easy to produce and could be driven without much effort. Further they have an acceptable power consumption compared with expensive LCDs. Moreover, they could be controlled to output a light, which could be easily recognized, even if light is incident on the surface of the display unit. Moreover, limitations like viewing angle or refreshing rate are uncritical.

Preferred embodiments of the invention will be explained based on the dependent claims.

The LEDs of the display unit output a light having the same characteristic as a characteristic of the light output by the light system. Thus, if the light system is controlled to be maximal in its level also the light output by the display unit is to be controlled to be maximal. The same applies for controlling the level in a dimming function to be minimal.

Preferably, the user interface device is equipped with a proximity sensor and/or a brightness sensor. Since the providing of feedback or feed forward information on the user interface device is only necessary, if a user is in proximity to the user interface device it is proposed to display the feed forward or feedback information only during controlling the light system or to provide the information only if the user is in a predetermined proximity to the user interface device. Moreover, the intensity of providing the information could be controlled to be dependent on the daylight. Therefore, it is advantageous to have a brightness sensor included in the user interface device to provide a signal as a reference for adjusting the brightness of the provided information. This provides the possibility to increase the recognizability for the user. Moreover, this avoids a waste of energy.

Preferably, it is proposed to illuminate a small area, which is softly glowing by switching on a group of LEDs of the matrix to indicate that the light system is switched off, wherein the intensity of the light of the glowing area is based on the brightness or depending on a detected person.

When a user touches the input unit, the small area, which is softly glowing, will be changed in its appearance. It is possible to illuminate the whole area or a larger part of the small area in the same color or in the level, which is output to the light system. Thus, the user may easily recognize that the lights are switched on. This will facilitate the control of the light system if the light system is not directly in proximity of the user interface device, like a hidden place or another room.

Moreover, by the input unit in front of the display device it is possible to sense a moving direction on the input device to control the setting of the light system continuously. The input unit will detect the moving direction of an object on its surface, wherein depending on the moving direction and on the amount of moving or distance of the movement the control unit will adapt the characteristic of the light system respectively. Thus, when a user moves his finger to the lower edge, the light system will be dimmed to nearly switched off, wherein when moving the finger to the upper edge of the user interface device, the control unit will recognize this movement and will control the connected light system to be dimmed to fully switched on. Moreover, the amount of dimming may be represented by dividing the area of the display unit into parts, wherein the lower parts illuminated for instance in yellow indicates the amount of light outputted by the light system and the upper part is not illuminated and indicates the amount of the remaining amount.

Moreover, the control unit is equipped with a memory for storing a dimming level output to the light system before switching off the light system. Thus, when switching on the light system, the user interface device is able to use the stored dimming level and to control the connected light system depending on the stored dimming level.

Preferably the user interface device may output the control signal to the light system in two different ways. One alternative could be to display on the display unit the respective level of the light directly when moving the finger on the touch pad before sending out the respective control signal. The corresponding control signal to control the connected light system based on the user input is output if the finger is released from the input unit. Thus, the user may recognize, what is the effect on its respective user input before setting the respective light system.

Another alternative is that the control signal output to the light system is sent directly to the light system when touching or moving the finger on the input unit, wherein the display unit in the user interface device may receive in parallel or simultaneously the corresponding information signal to provide the feedback information.

Preferably, the user interface device may have a cover layer having a certain relief in its surface, so the user interface device may provide feed forward information to the user as to how to use a controller. A flat surface on the cover layer suggests a touch action on preset areas to switch on a preset number of lights of the light system or to switch on or off the light system, while a vertical dent suggests the possibility for up and down movement to dim the level of the light system or to amend the color temperature depending on a colored scale displayed under (i.e. behind) the vertical dent.

An alternative possibility is to place a printed piece of paper between the input unit and the display device or in front of the display unit and the input device. Thus, the LEDs of the display device may illuminate the printed piece of paper and the printed scale on this piece of paper may be illuminated. Thus, the user can recognize which kind of colors are possible for the setting and the input unit will recognize a movement of a finger of the user for generating the respective control signal to set the light system correspondingly. In this case it is only required to display a light behind the printed scale on the paper. Thus, the amount of control is reduced since the LEDs need not to be displayed in different colors representing the scale of possible values for the setting of the light system. For inserting the piece of paper a slot is provided to place the paper in front of the LEDs.

Preferably, it is possible to display on the area of the display unit a plurality of preset areas, wherein the user may select a preset area to activate a pre-programmed setting, wherein the preset areas may be represented in a color, which corresponds to the color of the associated light setting. Moreover, it is possible that the color or size of the preset area is changed after selecting a preset area on the display device. Thus, it may be represented more saturated or with a larger size. Thereby, the user may easily recognize which preset area is selected due to its user input. Further, it is possible to use the background area outside the preset areas to display the color of the associated light setting after selecting a certain preset area.

In a further embodiment it is possible to represent by the LEDs a colored scale, which may be represented as a horizontal or vertical bar or in ring form or in an open ring form, wherein the scale represents adjustable values of a color temperature, brightness, time or saturation of the light system, wherein the surrounding background area may be used to display the characteristic corresponding to values selected on the scale via the user input. Thus, in case of adjusting the color temperature to be cold, the background of the display unit will be displayed in a white or blue color, wherein when moving the finger into direction of the scale for adjusting a more warm color temperature, the background area will be illuminated in a warm yellow or orange color tone.

Further, it is possible to use the brightness sensor to control the light system and the display device depending on the current daylight including a predetermined number of light sources, a predetermined color or a predetermined brightness. Thus, it is possible to define depending on the time the number, position and color of the light sources of the light system and to change the setting depending on the daylight and time of the day.

In a further preferred embodiment, it is possible that the control depending on the daylight or time is performed automatically. Thus, the user interface device will represent the feedback information by displaying a feedback indicator on a scale indicating the current setting of the light system, wherein the feedback indicator is automatically moving depending on time or depending on the daylight sensed by the brightness sensor. This automatic control can be interrupted by a user input. Thus, the user may shift the feedback indicator on the scale into a desired direction and will thereby stop the automatic control, wherein by touching a predetermined area outside the scale the automatic control is restarted.

Moreover, it is possible to use a timer control function in the user interface device, which allows a dynamic light setting, which could be automatic or user controlled. Thus, it is possible to automatically fade out the light over the time. The amount of time may be represented on the display unit by number of dots, which is decreasing during expiration of time, wherein the user may increase the time for fading out by touching a position for increasing the number of dots. Thus, it is possible to recognize by the user how many dots are displayed and the user may recognize how long it will take until the lights are switched off.

Preferably, the user interface device includes a control unit, which has a central computing unit, a memory, an LED controller and an input interpreter. Further, a light control interface outputs the control signal to the light system for adjusting the power consumption or other parameters of the connected light system. The touch input interpreter detects a touch on the sensitive matrix on the touch pad and provides the position of the user input to the central computing unit, wherein the central computing unit outputs the information signal to the LED controller for providing the respective feedback/feedback information to the LED matrix for illuminating the matrix corresponding to the user input. Moreover, the central computing unit is outputting the control signal to the light control interface for controlling the connected light system. The memory is connected for storing dimming levels, a number of preset settings for predetermined times or preset scenarios. Further, the brightness and proximity sensors are connected to the central control unit. It is possible to arrange the display device and the input device in layered form, which are then covered by a covering layer. Further, it is possible to insert a piece of paper in front of the display device to illuminate for instance a scale on the piece of paper. A further possibility is to arrange the LEDs and touch sensitive elements together in a common layer. Thus, a very flat user interface device could be achieved. The electronics for controlling the display device and the connected light system may be accommodated in the user interface device, but it could also be located remote to the user interface device, wherein the data transmission may be a wired based or wireless link.

The object is also solved by a light system using a user interface device as described above.

Moreover, the object is solved by a method for controlling a light system including the steps of: receiving a user input on a touch pad, determining the position of the user input in the touch interpreter, generating a control signal for controlling the connected light system based on the position of the user input and the current control function performed by the user interface device, generating an information signal corresponding to the control signal and outputting the information signal to the display device including a plurality of LEDs. By this the feedback/feedback information is provided to the user simultaneously or before controlling the connected light system. Thus, the user is able to easily recognize the effects and/or status of the light system during or in advance of the control based on the user input.

The object is also solved by a computer program or a computer program product performing the steps of the method as described above when executed on a computer. Further, it is solved by a data carrier including such computer program for performing the steps of the method as described above when executed on a computer. Finally, it is solved by a computer executing such computer program for performing the steps of the method as described above when executed on a computer.

BRIEF DESCRIPTION OF THE DRAWINGS

The invention will be described in greater detail hereinafter, by way of non-limiting examples with reference to the embodiments shown in the drawings.

DESCRIPTION OF EMBODIMENTS

Figure 1:
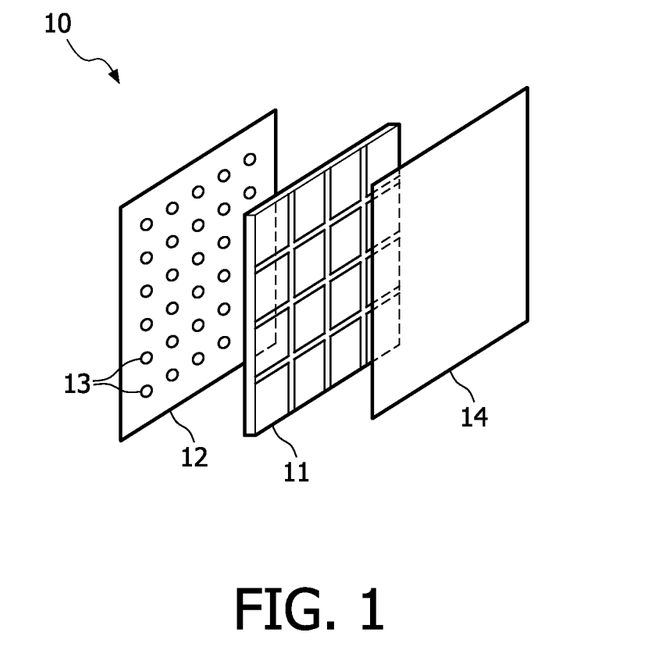
FIG. 1 illustrates an exemplary construction of the user interface device according to the present invention.

In FIG. 1 the mechanical construction of the inventive user interface device 10 is illustrated having three layers. The first layer includes the display device 12 having a plurality of LEDs 13 arranged in matrix form. In front of the display device 12, there is an input unit 11, which may be realized as a touch pad having areas for detecting positions of user input. Moreover, a cover layer 14 is arranged in front of the input unit 11 to protect the underlying first and second layers. The cover layer 14 may have a diffusing function to diffuse the light outputted by the LED matrix.

Figure 2:
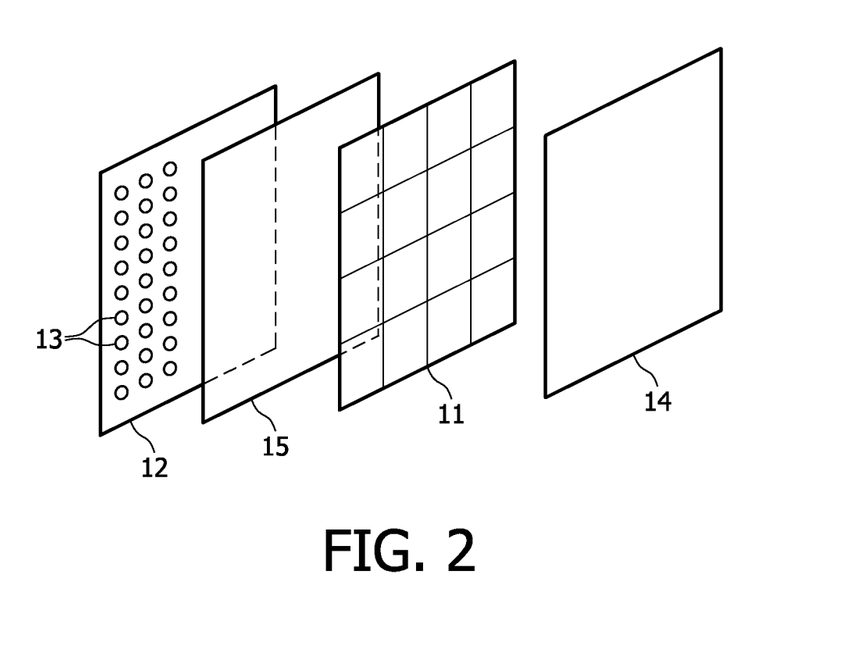
FIG. 2 illustrates an alternative embodiment of the user interface device according to the present invention.

FIG. 2 illustrates an alternative embodiment of the present invention. To reduce the effort for driving the display device 12, it is possible to insert a color layer or piece of paper 15 having a printed first and/or second scale. The color layer 15 is semitransparent. The display device 12 is stacked behind the color layer 15 and may display a certain color through the color layer 15. By arranging the color layer 15 in front of the display device 12, it is only necessary for the display device to illuminate the scale or a kind of feedback indicator. Thus, the LED controller 47 and the central computing unit 41 have only to illuminate the scale and/or to change the position of the feedback indicator. Moreover, the control device according to FIG. 2 includes a touch pad 11 and a protection cover 14 for protecting the other layers.

Figure 3:
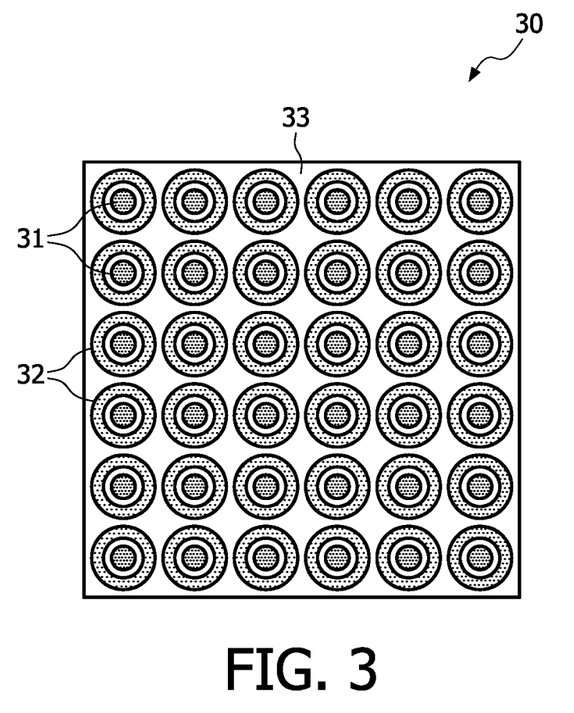
FIG. 3 illustrates a further embodiment for realizing a user interface device according to the present invention.

According to FIG. 3, the LED matrix includes a plurality of single full color LEDs 31 and touch sensitive elements 32 integrated into one single common layer 33. As shown in FIG. 3, the touch sensitive elements 32 surround each single LED 31. However, it is also possible that two or a small group of LEDs 31 is surrounded by one touch sensitive element 32. Moreover, it is possible to use a kind of grid, wherein the LEDs 31 are arranged in between the crossings of the grid of touch sensitive elements 32. The LEDs 31 and the touch sensitive elements 32 are accommodated or supported by a rigid surface layer 33 or a flexible surface layer using flex foils.

Figure 4:
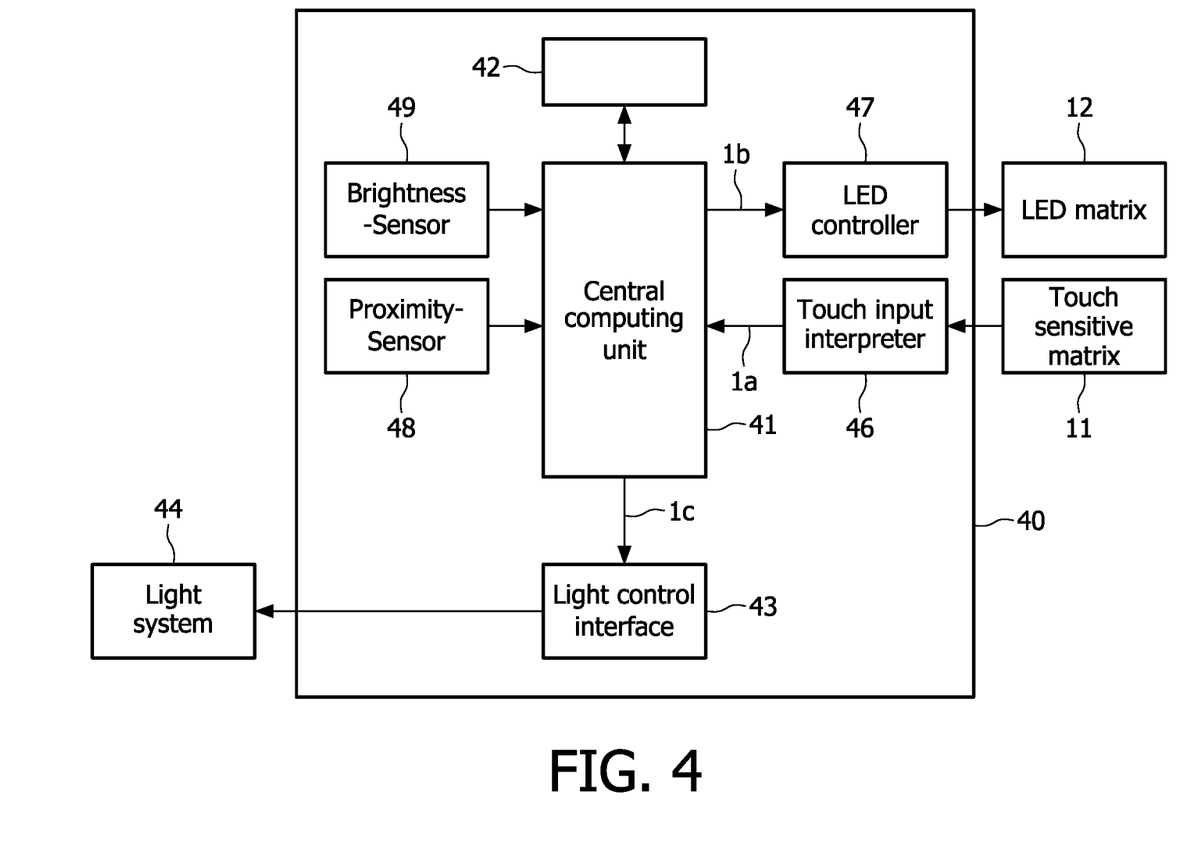
FIG. 4 illustrates a construction of a control unit of the user interface device according to the present invention.

With reference to FIG. 4, the construction of the control unit 40 in the user interface device according to the present invention will be explained. The user interface device includes a control unit 40 having a central computing unit 41 receiving a user input at the input device 11, e.g. touch screen, via the user input interpreter 46. The user input interpreter 46 determines a position of the user input and provides the position to the central computing unit 41. The central control unit 41 is connected to an LED controller 47 connected to the LED matrix 12. Moreover, the control unit 41 may be connected to a memory 42 for storing program code, control functions, dimming levels, predetermined colors of a feedback indicator, ect. The central computing unit 41 is connected to a light control interface 43 controlling the connected light system 44. A brightness sensor 49 and proximity sensor are connected to the central computing unit 41.

Figure 5:
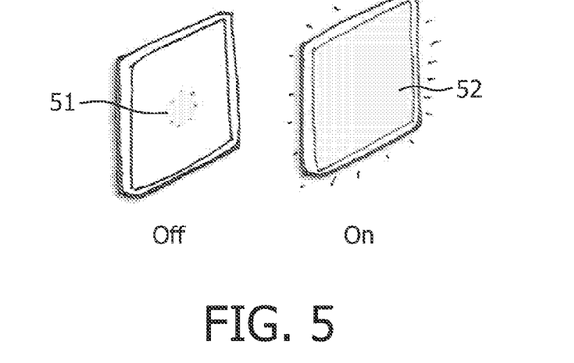
FIG. 5 illustrates a layout of the user interface device indicating the on/off control-function.
Figure 6:
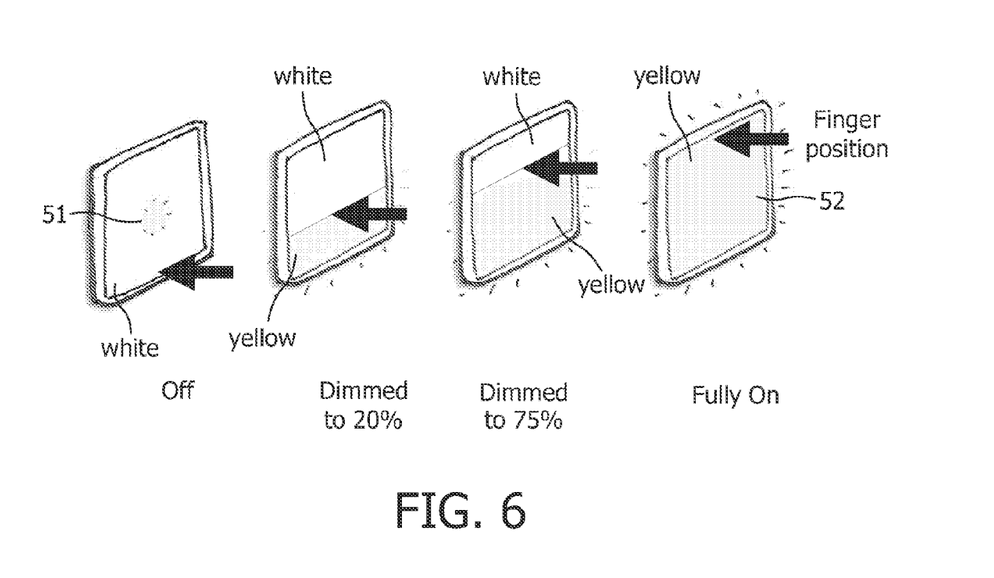
FIG. 6 illustrates the dimming control function.

As described in FIG. 5, the user input device is able to switch on/off the connected light system as well as to dim the light system as illustrated in FIG. 6. In the left layout of FIG. 5, a small soft glow 51 is displayed when the light system is off. Thus, the user can find the user interface device in the dark as well. The light of the small dot 51 is only glowing if the brightness sensor 49 detects that it is somewhat dark or that the daylight is below a predetermined threshold. During normal daylight it is not necessary to indicate the position of the user interface device. Thus, the glowing small dot 51 is not illustrated during daylight. In case of actuating or pressing the surface of the user interface device to switch on the connected light system, the display device of the user interface device will light up to provide the feedback information that the light is switched on. Also in this case, the light up of the display unit is only necessary if the surrounding light is somewhat dark, since during daylight it is neither recognizable nor necessary to indicate on the display device that the light is switched on. If the user presses the input unit 11 at any position again, the light switches off again and the display device again shows a small soft glow.

FIG. 6 illustrates the use of the user interface device as a dimmer. In a left figure, the situation is illustrated when the light system is switched off. A small dot or area 51 is glowing indicating that the light system is switched off. The user can dim the light by pressing the input unit and moving the finger up and down on the input unit. The position of the finger reflects the light level of the light system, wherein moving the finger completely to the bottom of the input unit completely dims the light system while moving the finger completely to the top of the user interface device sets the light system to the maximum output as shown in the right hand layout of FIG. 6. By moving the finger illustrated by the arrow down to the lower edge of the surface of the user interface device, the connected light system is switched off. The display device of the user interface device is then illustrated in white or no color to indicate that no light is switched on. When moving up the finger in vertical direction on the surface of the user interface device as illustrated in the second figure of FIG. 6, the lower part of the surface will be illuminated in yellow or other color to indicate that the connected light system is dimmed to 20%, wherein the remaining upper part of the surface is illuminated in white or switched off. Thus, the user is provided with feedback information, that only a small amount of light is output by the light system. When moving the finger to ¾ as shown in the third layout of FIG. 6, the light is controlled to be dimmed to 75%, wherein the part illuminated in yellow is increasing and the part on the surface illuminated in white or being switched off is decreasing. Thus, the user may easily recognize that the light is illuminated stronger. The right hand layout in FIG. 6 illustrates the situation that the connected light system is fully switched on. Then the whole area of the display device is illuminated in yellow. For switching the connected light system in such state, it is necessary to move the finger or object to the upper edge of the surface of the user interface device. When the user switches off the light system by pressing the input unit at a predetermined position the dimming level is stored in the memory 42 of the control unit 40. If the user presses the input unit 11 again to switch on the light system, this dimming level is used and the light system is set based on the stored dimming level. However, of again moving the finger on the input unit the light system is dimmed, since in this case the position of the finger is determined as the dimming level.

Note that one can choose an implementation such that when the user presses the user interface device it uses the LED matrix to show what the light level will be, and when the user releases his finger it sends the control signal 1c to the light system 44. In this way the user would look at the display device 12 for feed forward information. This would be useful for dimming or color control as explained later, but it would not be so useful for on/off switching. Therefore, an alternative implementation is that when the user presses the input unit it uses the LED matrix to show what the light level will be and it sends the control signal 1c to the light system immediately. In this way the user would look at the lights in the room for feedback information.

Figure 7:
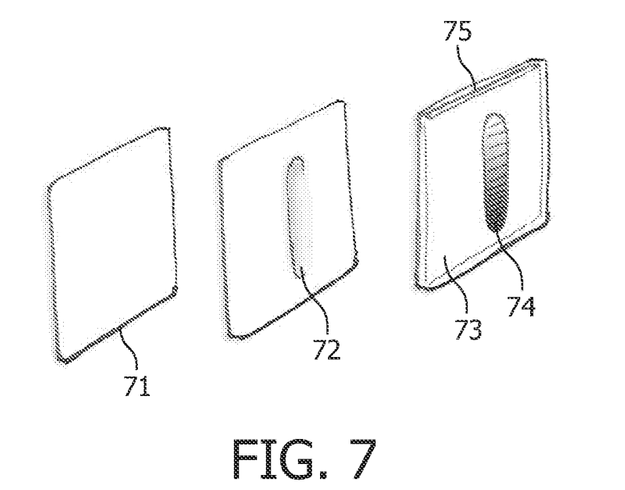
FIG. 7 illustrates a user interface device having a relief or a feed forward paper.

FIG. 7 illustrates examples for providing feed forward information to the user as how to use the user interface device. A left hand layout provides a smooth diffuse cover 71 for diffusing the light of the LEDs 13, wherein no preferred relief is present. Thus, the user may touch or press at any position of the user input in the left layout. The middle layout of FIG. 7 illustrates a relief 72 in form of a vertical dent indicating to the user where to move the finger for adjusting an associated value. In the right hand layout of FIG. 7 the user interface device is equipped with a slot 75 for inserting a paper 74 having a printed scale 73. The paper 74 is placed in front of the LED matrix 12. Thus, the LED matrix 12 will illuminate the paper 74 at the area of the scale 73. Then, the user may move his finger on the scale 73, thereby controlling the light system 44 depending on the values of the scale. Such realization is easier since the LED matrix 12 needs only to illuminate the scale 73 without being controlled in different colors.

Figure 8:
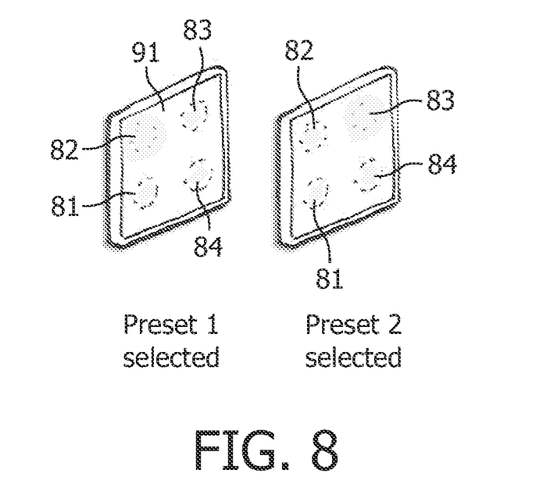
FIG. 8 illustrates a layout representing preset areas.

A further preferred embodiment is illustrated in FIG. 8 describing a preset selection. The user interface device shows a number of preset areas 81-84 that can be pressed by means of multiple dots of glowing light. These preset areas 81-84 or dots could be of one color, but alternatively colors could be used which pose some resemblance to the color of the preset. For example a red dot may indicate the cozy, romantic setting of the light system 44, whereas a blue dot represents a cool, calm, refreshing morning setting. The user can press on a dot 81-84 to select the preset. The light color can reflect the (average) light color in the preset. The dot of light of the preset area that is selected is larger than the other dots of light. Again one can choose to provide feed forward information using the lights in the display unit 12. If the user presses the input unit 11 the preset area 81-84 that is not yet lit shows an indication of what the preset will be. As long as the user keeps his finger on the input unit 11 and moves to other preset area, the according light color is shown on the display unit 12. Only if the user releases his finger the actual preset is selected. Alternatively, a preset is selected and rendered in the room as soon as the user moves his finger onto the preset area 81-84 of light representing that preset. The input unit 11 maybe covered by a cover (not illustrated). The cover may have a relief to provide feed forward information to the user as to how to use the user interface device. Multiple small dents suggest multiple preset areas 81-84 that can be pressed or selected. This feed forward information can also/additionally be given by using a printed piece of paper. On this piece of paper the preset areas can be indicated with names, numbers or again colors which pose some resemblance to the color of the presets.

Figure 9A:
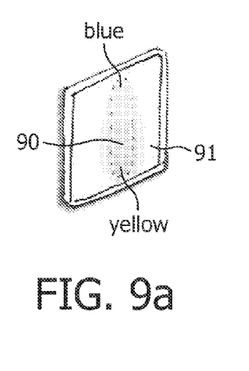
FIGS. 9a and 9b illustrate a layout of the user interface device illustrating a colored scale.
Figure 9B:
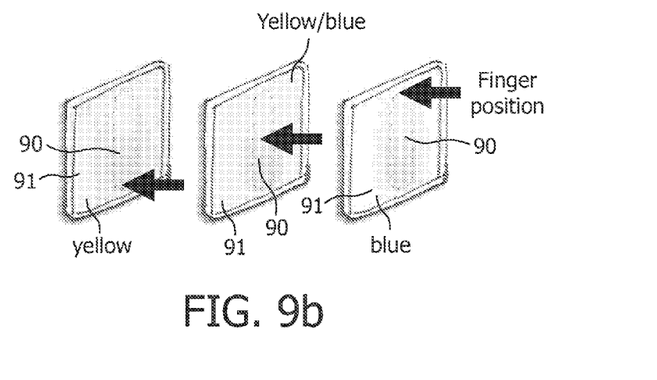

Based on FIGS. 9*a* and 9*b* a color temperature control is explained. The user interface device illustrates a scale 90 displayed in different colors starting e.g. from yellow at the bottom and blue at the top of the scale. When moving the finger as indicated by the arrows, the background area 91 may be displayed in a color corresponding to the color of the scale. Thus, the user may easily recognize in which color the light system 44 is set. The right hand layout of the FIG. 9*b* illustrates the situation when the finger is placed on top of the scale 90. Then, the background area 91 is displayed in blue.

A third control function, which may be controlled by use of scale 90 as shown in FIGS. 9*a* and 9*b* is the variable color temperature control for a light system 44 that can render light ranging from cold bluish light to warm reddish light. The display unit 12 shows a scale of light ranging from cold colored light to warm colored light or vice versa. A dot of light within the scale 90 may indicate what light setting is currently selected. The user can press to select a color temperature directly or press and move to change the color temperature. This scale can be vertical or horizontal. Alternatively it can be the whole surface that changes from cold to warm in vertical or horizontal direction. Finally, it can also be a circle. Also for this control function one can choose to provide feed forward information using the LEDs in the user interface device. If the user presses the input unit 11 the area that is not yet lit shows an indication of what the color temperature will be. As long as the user keeps his finger on the input unit 11 and moves for instance left and right, the according light color is shown on the display unit 12. Only if the user releases his finger the actual preset is selected. Alternatively, the color temperature selected is rendered by the light system immediately. The user interface device may have a relief to provide feed forward information to the user as to how to use it, wherein a linear vertical dent suggests the possibility for up and down movement to vary the color temperature. A linear horizontal dent suggests the possibility for left and right movement to vary the color temperature. A circular dent suggests the possibility to change the color temperature in a circular motion. This feed forward information can also/additionally be given by using a printed piece of paper.

Figure 10A:
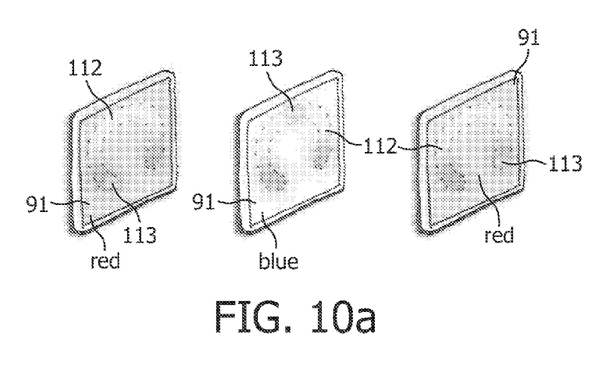
FIGS. 10a and 10b illustrate an automatic daylight control function.
Figure 10B:
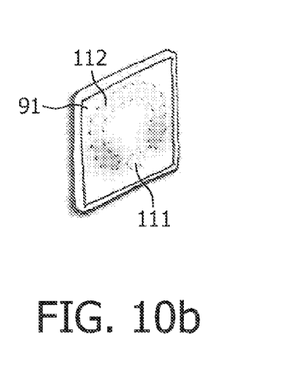

Based on FIGS. 10*a* and 10*b* a daylight control function will be explained, the display unit 12 may display an open ring scale 112, wherein a feedback indicator 113 is displayed within the ring 112 indicating the current preset with the preset value, which is output to the light system 44. Also here, the background area 91 is used for displaying a light corresponding to the characteristic of the light system 44. When the feedback indicator 113 is placed in the red values of the scale 112 the background area 91 is illustrated in red (left and right hand layout in FIG. 10*a*). When the feedback indicator 113 is placed in the blue area of the scale 112, the background area 91 is illustrated in blue (middle layout in FIG. 10 *a*).

Daylight control is an essentially variable color control, but it can also comprise the application of different light sources in a system for different settings. For instance, evening light is warm and cozy and hence light near the ground will be used more, while morning light is energizing and bright and hence light near the ceiling will be used. Also, light levels are part of the different settings. For instance evening light is warm and cozy and hence light will be mostly dimmed, while morning light is energizing and bright and hence light will be mostly set to high light levels. Additionally, the user interface device can automatically follow the daylight rhythm by taking into account the time of day. As shown in FIG. 10*a* and 10*b* the display unit shows a line or partial circle of light showing the various daylight settings. A feedback indicator 113 of light shows what light setting is currently selected. The user can press to select a daylight setting directly or press and move to change the daylight setting. If the user interface device would automatically follow the daylight rhythm, the user would over ride this dynamic. In that case the user would need an option to reset the user interface device to 'automatic'. For this purpose predetermined area 111 shown as a dot of light at the bottom of the partial circle would offer the option to reset the user interface device to automatic. As already explained for the above-mentioned control functions the background area 91 may be used to provide feed forward information. If the user presses the input unit 11 the background area 91 that is not yet lit shows an indication of what the daylight setting will be. As long as the user keeps his finger on the input unit 11 and moves, the according daylight setting is shown on the display unit 12. Only if the user releases his finger the actual preset is selected and the control signal 1*c* is output by the control unit 40. Alternatively, the daylight setting selected is rendered by the light system immediately. A relief may provide feed forward information to the user as to how to use it. A circular dent suggests the possibility to change the daylight setting in a circular motion, and a small dent suggests a button-like action to reset to automatic. Alternatively this feed forward information can also/additionally be given by using a printed piece of paper.

Figure 11:
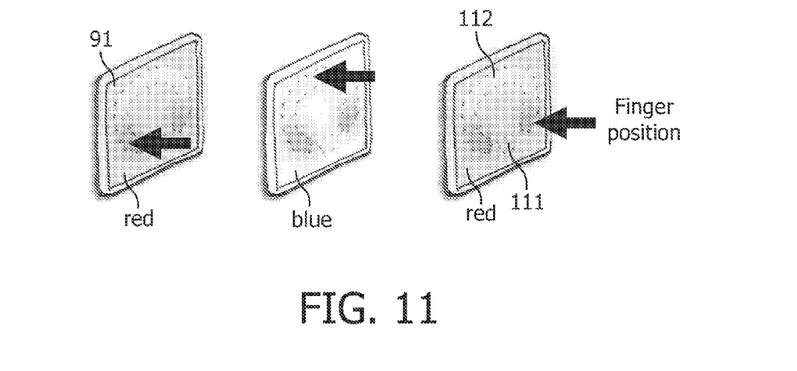
FIG. 11 illustrates a manual day light control.

With reference to FIG. 11, a daylight control manual mode with feed forward and feedback information is illustrated. When touching the scale 112 during daylight control, the automatic control is stopped and the light system is switched into a state, which corresponds to the position on the scale, where the finger is pressed as indicated with the arrows. When pressing the finger in the red area of the scale 112 as indicated in the left hand layout the connected light system is switched into a warm color temperature, wherein also the background area 91 is illustrated in a warm red color. Wherein when placing the finger in the blue area of the scale 112 the connected light system and the background area 91 is illustrated in blue as indicated in the middle layout. When pressing the predetermined area 111 at the lower edge of the display unit 12, the automatic daylight control is activated again.

Figure 12:
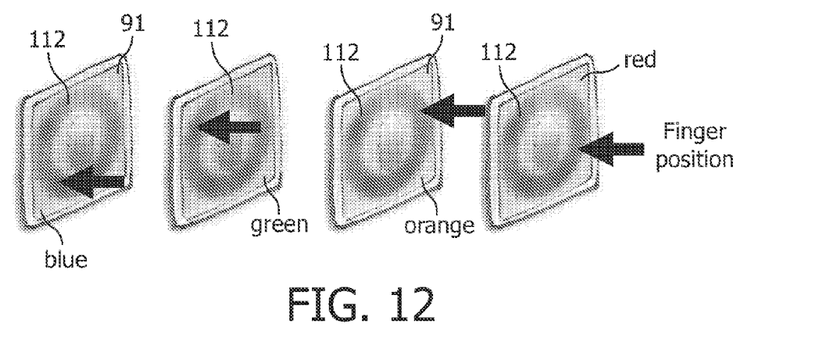
FIG. 12 illustrates a color control with feedback/feed forward information.

With reference to FIG. 12, the color control with feedback/feed forward information is explained. When moving the finger as indicated by the arrow on the scale 112 of the display unit the background area 91 is illustrated in the same color as chosen on the scale 112. Thus, when placing the finger in the blue area of the scale 112 (left hand layout, the background area 91 is illuminated in blue, wherein when placing the finger in the green area 112 ($2^{nd}$ left layout) the background area 91 is illustrated in green, wherein when placing the finger in the orange or yellow area of the scale 112 ($3^{rd}$ layout) the background area 91 is illuminated in orange, wherein when placing the finger in the red area of the scale 112 ($4^{th}$ layout) the background 91 is illuminated in red.

Figure 13A:
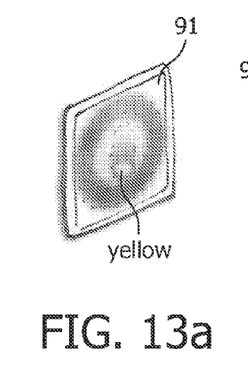
FIGS. 13a and 13b illustrate feedback indicator and a color control.
Figure 13B:
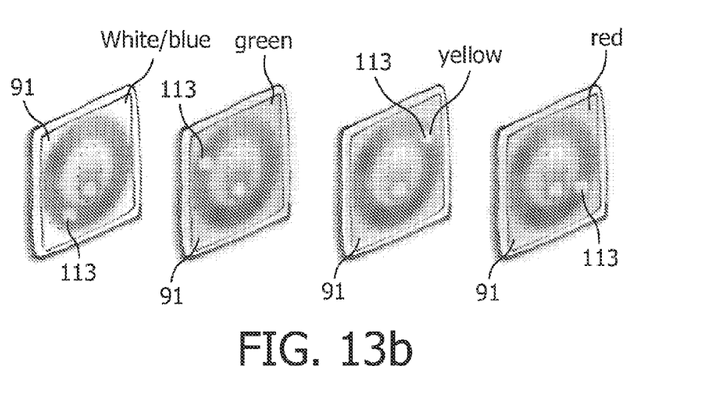

With reference to FIGS. 13a and 13b, the color control using a feedback indicator 113 is explained. It is further possible to use a feedback indicator 113, which is displayed in the scale 112, wherein the position of the feedback indicator 113 represents the current setting of the light system, wherein the color of the light system is also illustrated via the color of the background area 91. Thus, when placing the feedback indicator 113 in the blue area, the background area 91 will be illustrated in the white or blue color tone and correspondingly for the other colors as shown in FIG. 13b.

When using full color light sources in a light system color control is an eminent necessity. The users can set the color, but also the color intensity (saturation). It is suggested that the user interface device shows a color circle using the matrix LEDs, as indicated in FIGS. 10-13. A dot of light may show what color is currently selected. The user can press to select a color directly or press and move to change the color. Alternatively to a circle a line of colored light can be used to control the light color similar to the dimming and color temperature control. The saturation can be controlled using a line of light ranging from saturated color to white light. This saturated color changes with the color selected. A dot of light shows what saturation level is currently selected.

Again one can choose to provide feed forward information using the lights in the user interface device. If the user presses the input unit the area that is not lit yet (e.g. background area) shows an indication of what the color and saturation will be. As long as the user keeps his finger on the controller and moves, the according color and saturation is shown on the controller. Only if the user releases his finger the actual setting is realized. Alternatively, the color and saturation selected is rendered by the light system immediately.

Figure 14A:
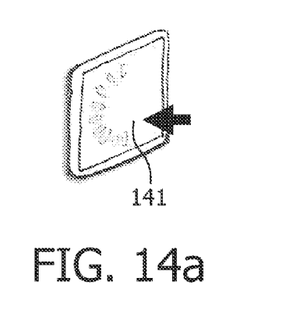
FIGS. 14 and 14b illustrate a timer control function.
Figure 14B:
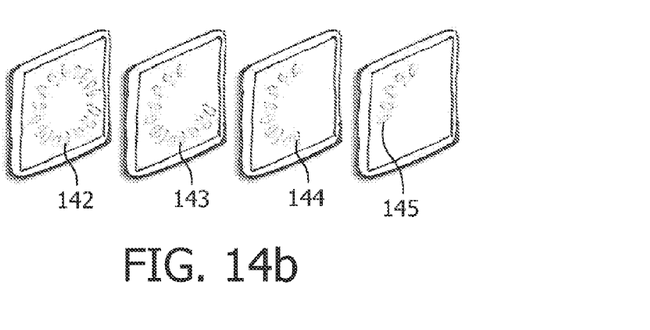

With reference to FIGS. 14a and 14b a further control function is explained, wherein the display device illustrates a plurality of small glowing dots 142-145 arranged in a circle, wherein the number of dots indicates the amount of time for fading out of the lights of the light system. FIG. 14b illustrates different numbers of dots, wherein the left hand layout indicates maximum number of dots and the right hand layout illustrates the situation shortly before fading out the light. When pressing the finger outside the number of dots as indicated in FIG. 14a, the user may increase the number of dots, wherein during expiration of the time the number of dots is decreasing. Thus, the user may easily recognize when the lights will be switched off. Advanced light systems allow for dynamic light settings, either automatic or user controlled. An example of a simple dynamic control is a slow fade out of the light over time, as a more gradual way of switching the lights off. In some cases for instance in a bed room or hotel room the user would want to set the time it takes to switch off the lights so that he can go to sleep. For this it is proposed that the display device shows soft glowing dots 142- 145 of light in a circle representing 60 minutes for a full circle. If the user presses the input unit of the user interface device at any place, the dots light up brighter. The user can press anywhere on the circle to set the amount of minutes it should take. After this the dots switch off one by one reflecting the time that has passed. The user can always reset the timer to a new time. If the user has set the timer a dot of light in the middle (not illustrated) may provide the option to switch off the timer again. Alternatively a simple clock face with a hand could be displayed and the segments before and after the hand could be of a different color to help reaffirm how much time remains before the lights switch off. By "dragging" the clock's hand with a finger the user can increase or decrease the amount of time on the timer. Also in this case the cover may be provided with a relief to provide feed forward information to the user as to how to use the timer function of the user interface device. A circular dent suggests the possibility to set the timer and a small dent suggests a button-like action to switch off the timer. This feed forward information can also/additionally be given by using a printed piece of paper.

Figure 15:
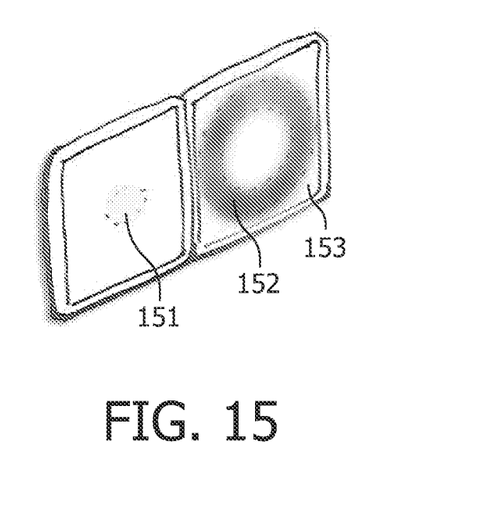
FIG. 15 illustrates a further embodiment having multiple display units.

Moreover, FIG. 15 illustrates an embodiment having a plurality of display units with attached input units for controlling connected light system. In this case, it is possible to have one control unit handling the plurality of display and input units, wherein it is also possible to have a control unit per display and input unit. As shown in FIG. 15, it is possible to have one user interface device having switch on/switch off function indicated by the small glowing area 151 in the middle, wherein the right hand user interface devices is used for color control, wherein the colored scale 152 is used for changing the color of the light system and the background area 153 is used for providing feedback information to the user, which color is set at the light system.

Figure 16:
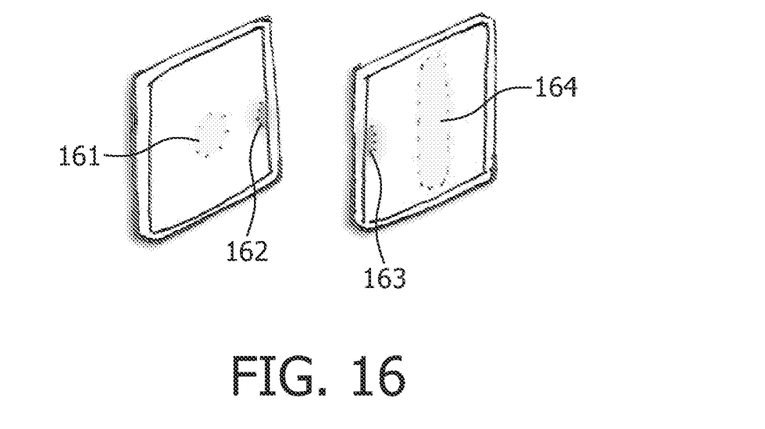
FIG. 16 illustrates a navigation function of the user interface device.

As described above with the plurality of different control functions the user interface device can facilitate multiple control functions. In some cases it makes sense to have multiple user interface devices with different control functions (FIG. 15). For instance, an on/off & dimming control and a timer or color control. In other cases it makes more sense to incorporate multiple functions in one user interface device. With multiple functions in one user interface device one could offer these control functions all at the same time, but given the limited surface area of the display unit it is more likely that these functions need to be presented one at a time. This implies the need for navigation from one control function to another. It is proposed to provide a small dot 162, 163 of light at the left and right hand side of the display unit to navigate from one control function to another. As illustrated in FIG. 16, the navigation from one control function to another control function is explained. Here it is shown on two different control layouts. When offering a plurality of different control functions a navigation indicator 162, 163 is displayed. In the left hand layout the normal on/off switching control function having the small glowing area 161 in the middle is illustrated, wherein when pressing the navigation indicator 162 the control function illustrating the colored scale 164 is illustrated on the display device. Pressing the navigation indicator 163 the color control function is switched back to on/off function. By navigating through the different control function, it is possible to control the connected light system in different characteristics, wherein it is easily possible to understand the different control functions by using the illustrated scales and the provided feed forward and feedback information of corresponding to the settings of the connected light system.

The invention can be applied for any light or light system. It is however especially useful for lights or light systems with extended control possibilities, like color control, timers, daylight control, et cetera. These light systems are becoming available in professional domains like the retail domain, but also in consumer domain, like hotel rooms, homes and gardens.

The invention claimed is:

1. User interface device for controlling a connected consumer load, comprising:
   a display unit including a plurality of LEDs in a matrix form, wherein each of the LEDs of the matrix is addressable individually;
   an input unit to receive a user input;
   a control unit adapted to receive a signal based on the user input and to generate an information signal provided to the display unit and to generate a control signal for controlling the connected consumer load, wherein the user interface device further comprises a cover layer over the input unit having a surface representing adjustable values which provides feed forward information to the user how to use the user interface device.

2. User interface device as claimed in claim 1, wherein the LEDs are used for providing at least one of feedback and feed forward information on the status of the connected consumer load, wherein the consumer load comprises a light system.

3. User interface device as claimed in claim 1, the consumer load comprising a light system and wherein the LEDs of the display unit have at least one of output light having a characteristic corresponding to the light output by the light system and are adapted to control elements of a control function to control the connected light system.

4. User interface device as claimed in claim 1, the consumer load comprising a light system and wherein when touching the input unit the corresponding control signal is directly sent to the light system, wherein the display unit receives a corresponding information signal.

5. User interface device as claimed in claim 1, the consumer load comprising a light system and wherein the surface further comprises a relief comprising:
   at least one of a vertical dent and
   a slot for inserting a paper indicating a feed forward information, wherein a color layer representing a scale for adjusting values of the light system is arranged in front of the display device.

6. User interface device as claimed in claim 1, the consumer load comprising a light system and wherein the display unit is adapted to display a scale representing adjustable values of at least one of the color temperature, brightness, on-time, saturation of the light system, and a background area having a characteristic corresponding to a value selected via a user input from the scale.

7. Light system having at least one of at least one full color light source and variable color temperature light source and having a user interface device as claimed in claim 1, wherein the consumer load comprising a light system.

8. User interface device for controlling a connected consumer load, comprising;
   a display unit including a plurality of LEDs in a matrix form, wherein each of the LEDs of the matrix is addressable individually;
   an input unit to receive a user input; and
   a control unit adapted to receive a signal based on the user input and to generate an information signal provided to the display unit and to generate a control signal for controlling the connected consumer load comprising a light system, wherein a group of LEDs of the matrix represent an area, which is adapted to glow softly, when the light system is switched off, wherein the glowing area is displayed based on a least one of the surrounding brightness, depending on a detected person, and after receiving a user input to switch on the connected light system, the display unit is adapted to illuminate the LEDs of the matrix in a bright light indicating that the light is switched on.

9. User interface device for controlling a connected consumer load, comprising:
   a display unit including a plurality of LEDs in a matrix form, wherein each of the LEDs of the matrix is addressable individual;
   an input unit to receive a user input; and
   a control unit adapted to receive a signal based on the user input and to generate an information signal provided to the display unit and to generate a control signal for controlling the connected consumer load comprising a light system, wherein the input unit is adapted to sense a moving of an object on the surface of the input unit, wherein the control unit is adapted to control a characteristic of the light system, depending on the moving object, wherein when controlling a dimming level of the light system to be minimal the light output by the display unit is minimal, wherein when controlling the dimming level of the light system to be maximal the light output by the display unit is maximal.

10. User interface device for controlling a connected consumer load, comprising:
    a display unit including a plurality of LEDs in a matrix form, wherein each of the LEDs of the matrix is addressable individually;
    an input unit to receive a user input; and
    a control unit adapted to receive a signal based on the user input and to generate an information signal provided to the display unit and to generate a control signal for controlling the connected consumer load comprising alight system, wherein when moving an object on the input unit the level of the light of the LEDs of the display unit is directly adapted, wherein when releasing the input unit the corresponding control signal is sent to the light system corresponding the level of light of the LEDs.

11. User interface device for controlling a connected consumer load, comprising:
    a display unit including a plurality of LEDs in a matrix form, wherein each of the LEDs of the matrix is addressable individually;
    an input unit to receive a user input; and
    a control unit adapted to receive a signal based on the user input and to generate an information signal provided to the display unit and to generate a control signal for controlling the connected consumer load comprising a light system, wherein the display unit is controlled to display at least one preset area, wherein the preset area represents a preset setting for the light system, wherein the at least one preset area on the display unit is displayed in a predetermined color representing the setting of the light system.

12. User interface device as claimed in 11, wherein when selecting a preset area, at least one of the selected area is enlarged in its size on the display unit or changes its color or brightness; and the display unit is controlled by the control unit to display in the remaining area outside the preset areas a color corresponding to the color of the setting of the light system, when receiving a user input on a preset area on the display unit.

13. User interface device for controlling a connected consumer load, comprising:
- a display unit including a plurality of LEDs in a matrix form, wherein each of the LEDs of the matrix is addressable individually;
- a input unit to receive a user input; and
- a control unit adapted to receive a signal based on the user input and to generate an information signal provided to the display unit and to generate a control signal for controlling the connected consumer load comprising a light system, wherein the display unit is adapted to display a colored scale and a background area, wherein when moving an object on the scale the background area color is amended to a color corresponding to the position of the object on the scale.

14. User interface device for controlling a connected consumer load, comprising:
- a display unit including a plurality of LEDs in a matrix form, wherein each of the LEDs of the matrix is addressable individually;
- an input unit to receive a user input; and
- a control unit adapted to receive a signal based on the user input and to generate an information signal provided to the display unit and to generate a control signal for controlling the connected consumer load comprising a light system, providing an automatic or user controlled light setting, wherein the light of the light system and the light output by the display device are faded out slowly over a preset time, wherein the user interface device may include means for setting the time for fading out the lights and the display unit may be adapted to display a number of glowing dots, wherein the number of dots represents the remaining fading out time, wherein a user may increase the fading out time by pressing the input unit at a place representing a higher number of dots, wherein during expiration of time the number of dots is decreasing.

15. Method for controlling a light system including the steps of:
- receiving a user input on an input unit;
- determining the position of the user input;
- generating a control signal for controlling the light system based on the position of the user input and the current control function;
- generating an information signal corresponding to the control signal; and
- outputting the information signal to a display device including a plurality of LEDs, wherein the user interface device further comprises a cover layer over the input unit having a surface representing adjustable values which provides feed forward information to the user how to use the user interface device.

16. A non-transitory computer program product for performing the method as claimed in claim 15 when executed on a computer.

17. Computer for executing a computer program as claimed in claim 16.

* * * * *